United States Patent [19]

Hamane et al.

[11] 4,391,306
[45] Jul. 5, 1983

[54] COIL WINDING APPARATUS

[75] Inventors: Tokuhito Hamane, Hirakata; Toshio Kinoshita, Katano; Masafumi Kihira, Hyogo; Hitosi Hamada, Yawata; Mikio Gotou, Neyagawa, all of Japan

[73] Assignee: Matsushita Electric Industrial Co., Ltd., Kadoma, Japan

[21] Appl. No.: 237,403

[22] Filed: Feb. 23, 1981

[51] Int. Cl.³ .............................................. B21F 3/00
[52] U.S. Cl. .................................................. 140/92.1
[58] Field of Search ................ 140/92.1, 92.2; 29/596, 29/732, 736

[56] References Cited

U.S. PATENT DOCUMENTS 3,872,897  3/1975  Droll et al. .................. 140/92.1

Primary Examiner—Lowell A. Larson
Assistant Examiner—Jonathan L. Scherer
Attorney, Agent, or Firm—Wenderoth, Lind & Ponack

[57] ABSTRACT

An improved coil winding apparatus, for example, for stators of electrical machines and the like, in which undesirable rising or floating of coils accommodated in a coil inserting jig is prevented by the employment of a rockable stop which permits the coils formed above the stop to be pushed onto the lower part of the coil inserting jig by the rocking function of the stop, and which cannot pivot past a horizontal position, thereby blocking floating or rising of coils off the coil inserting jig.

3 Claims, 5 Drawing Figures

COIL WINDING APPARATUS

BACKGROUND OF THE INVENTION

The present invention generally relates to a coil winding apparatus for stators, for example, of electrical machines and the like. More particularly, the present invention relates to improvements in a coil winding apparatus using the method of dropping a coil onto a coil inserting jig while winding a coil around a coil winding frame or spool.

For a coil winding apparatus of the above described type, there has conventionally been proposed an arrangement as shown in FIGS. 1 and 2 which generally includes a coil inserting jig 7 provided with a blade member 8 having a plurality of blades and an insulation guide 9, a coil winding frame or spool 3, a flyer 2, an inclined plate 4, and coil depressing or push rods 5, with a stop 10 being further provided for preventing the coil mounted on the coil inserting jig 7 from being undesirably raised or floated. In the above known arrangement, the flyer 2 with the electric wire 1 extended therethrough is rotated around the spool 3 to wind the electric wire 1 around said spool 3, and thus the coil 6 is formed. On the other hand, the inclined plate 4 is subjected to a rocking motion in synchronous relation with the rotation of the flyer 2 so as to vertically move the coil push rods 5. The coils 6 formed around the spool 3 one after another are sequentially downwardly drawn out by the vertical motions of the coil push rods 5, and are dropped onto the coil inserting jig 7. Upon completion of the formation of the coil 6 for a first pole, the spool 3 and the coil push rods 5 descend in the direction of the arrow A to place the coil 6 onto the coil inserting jig 7. Subsequently, the intermediate portion 1a of the electric wire 1 is grasped by a pawl (not shown), and the spool 3 and the coil push rods 5 rise to predetermined positions, and then the coil inserting jig 7 is indexed in the direction of the arrow B. At this time, the intermediate portion 1a' of the electric wire 1 grasped by the pawl moves as far as the winding position at 1a'', and after the spool 3 descends as far as said winding position, the coil for the next pole is formed in a similar manner as for the first pole, and the electric wire 1 grasped by the pawl is formed into an inter-pole connecting wire for connection between the poles. In the coil winding apparatus using the system of dropping the coil 6 onto the coil inserting jig 7, while winding the coil 6 around the spool 3 as described above, it is absolutely necessary that the coil 6 accommodated in the coil inserting jig 7 not be raised or floated during the winding operation.

However, in the conventional coil winding apparatuses, since a fixed type stop 10 is employed, a space x which allows the coil push rods 5 to pass therethrough is required between the stop 10 and the insulation guide 9 provided in the coil inserting jig 7. Therefore, the coil 6 accommodated in the coil inserting jig 7 is likely to be floated or raised either by the functioning of the pawl which grasps the inter-pole connecting wire through the space x so as to lift the coil up to the winding position or by spring-back of the coil 6 wound in the above described manner, thus making the winding operation difficult to perform. Furthermore, when the coil 6 has run over the stop 10 during the indexing of the coil inserting jig 7, the coil 6 thus raised is floated, also resulting in difficulties in the winding.

In another known coil winding apparatus proposed, for example, in U.S. Pat. No. 3,872,897, similar inconveniences as described in the foregoing are also encountered.

SUMMARY OF THE INVENTION

Accordingly, an essential object of the present invention is to provide an improved coil winding apparatus in which desirable rising or floating of the coils accommodated in a coil inserting jig during the coil winding function is prevented, thereby making for efficient coil winding.

Another important object of the present invention is to provide an improved coil winding apparatus of the above described type which has a simple construction and which functions accurately with high reliability, and which can be manufactured at low cost.

In accomplishing these and other objects, according to one preferred embodiment of the present invention, there is provided a coil winding apparatus which includes a coil winding spool on which coils are to be formed, a flyer for winding electric wire around the coil winding spool, a coil inserting jig which is rotatably supported with respect to the coil winding spool and which is capable of accommodating therein at least more than two poles of coils formed on the coil winding spool, and a stop which is disposed at the side of the coil inserting jig and arranged to prevent rising of coils for other poles already wound and accommodated in the coil winding jig during formation of the coils. The stop which is normally held horizontal is arranged to be rotatable only downwardly by a rocking plate associated therewith.

By the arrangement according to the present invention as described above, there is provided an improved coil winding apparatus which is highly efficient and which has a simple construction, and which substantially eliminates the disadvantages inherent in the conventional coil winding apparatuses of this kind.

BRIEF DESCRIPTION OF THE DRAWINGS

These and other objects and features of the present invention will become apparent from the following description of a preferred embodiment thereof and taken with reference to the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 3:
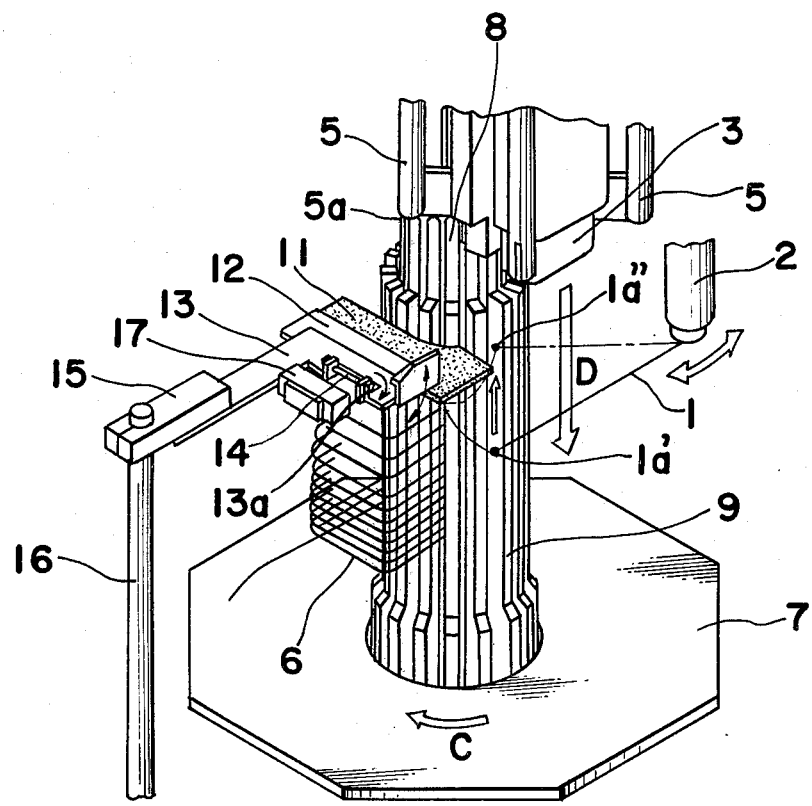
FIG. 3 is a fragmentary perspective view showing the essential parts of an improved coil winding apparatus according to one preferred embodiment of the present invention.

Referring now to the drawings, there is shown in FIG. 3 an improved coil winding apparatus according to one preferred embodiment of the present invention.

Figure 1:
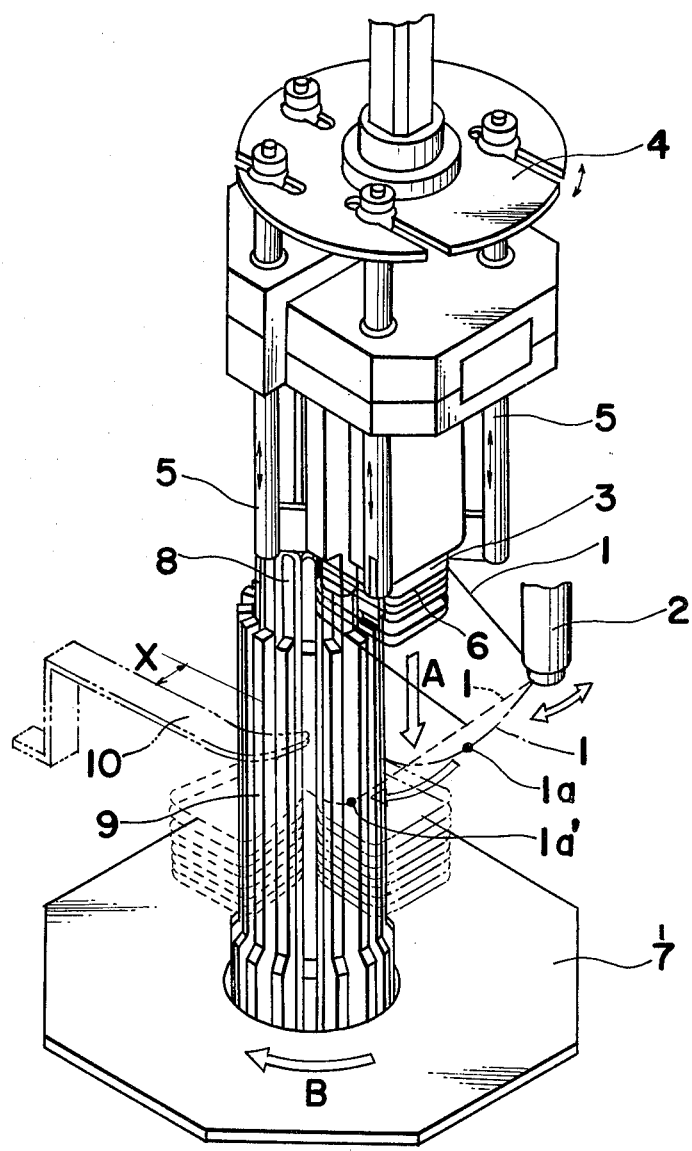
FIG. 1 and FIG. 2 are perspective views each showing essential portions of a conventional coil winding apparatus for explaining the operation thereof.
Figure 2:
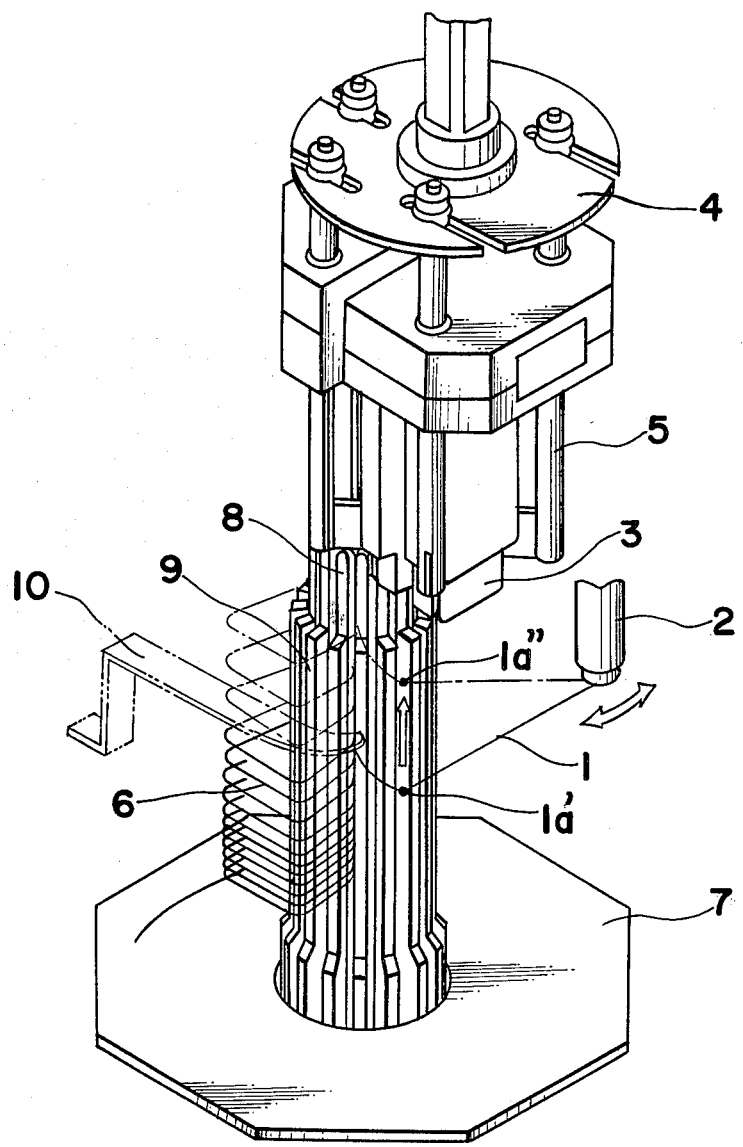

In FIG. 3, the coil winding apparatus generally includes a coil inserting jig 7 provided with a blade member 8 having a plurality of blades and an insulation guide 9, a coil winding frame or spool 3, a flyer 2, and coil push rods 5, etc., which are arranged in a manner similar to the arrangement of FIGS. 1 and 2, and generally designated by like reference numerals for brevity of description, except for the particular construction described hereinbelow and directly related to the present invention.

Figure 4:
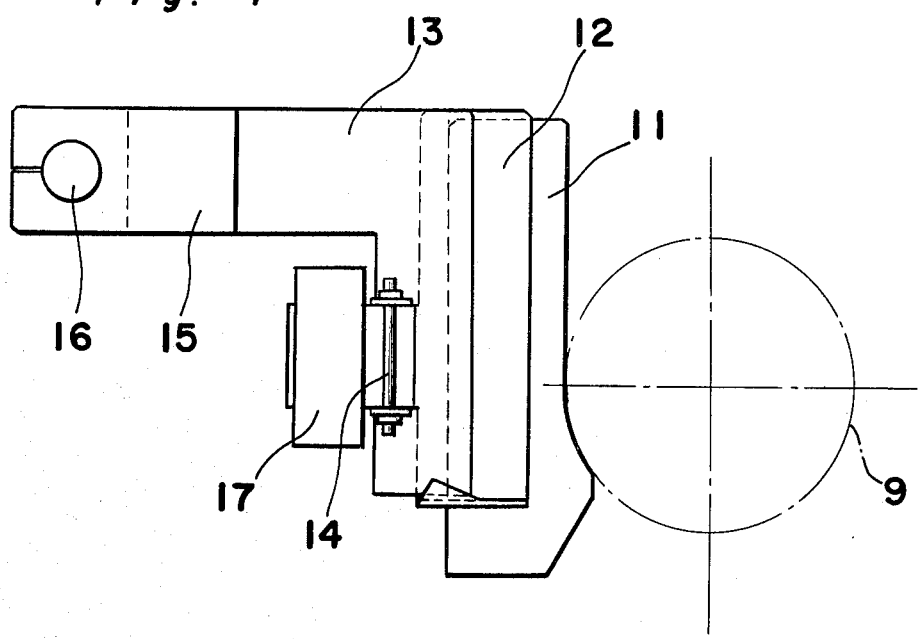
FIG. 4 is a fragmentary top plan view showing, on an enlarged scale, the main portion of the arrangement of FIG. 3.
Figure 5:
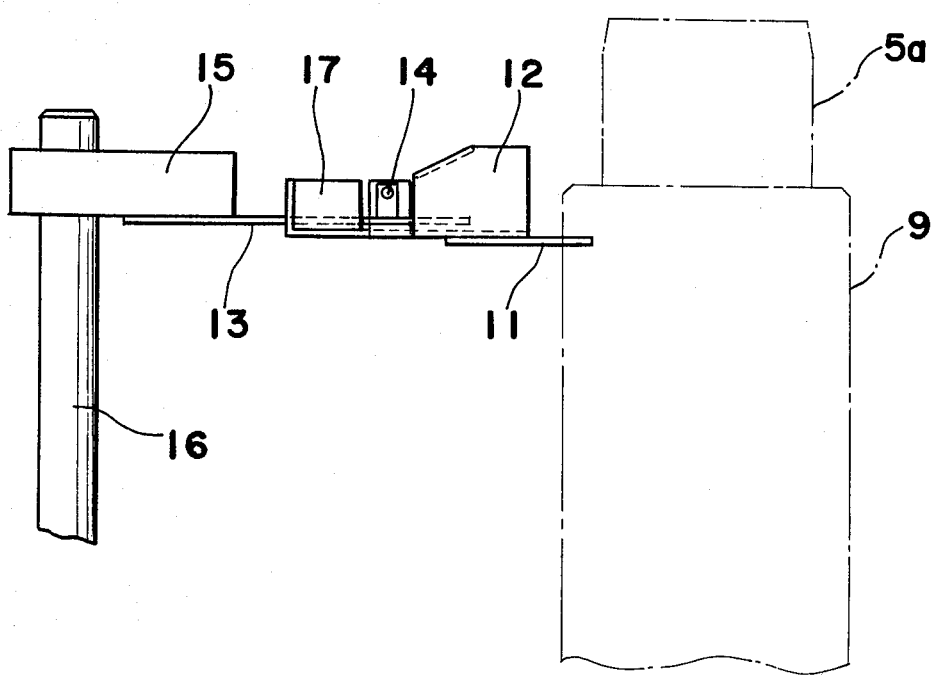
FIG. 5 is a side elevational view of the portion of FIG. 4.

Referring also to FIGS. 4 and 5, the coil winding apparatus of FIG. 3 further includes a stop 11 located at a position slightly spaced from the upper end portion of the insulation guide 9, a rocking plate 12 to which the stop 11 is secured, a support plate 13 provided with a supporting portion 13a, a supporting pin 14 which movably supports the rocking plate 12 on the support plate 13, a block 15 to which the support plate 13 is secured, a stand 16 to which the block 15 is adjustably fixed, and a balance weight 17 for returning the rocking plate 12 to a horizontal position when said rocking plate has been subjected to a rocking motion.

In the above arrangement, the coil 6 is formed in exactly the same manner as in the conventional arrangement described with reference to FIG. 1 and FIG. 2, and is accommodated in the coil inserting jig 7. After the coil 6 for the first pole has been formed and accommodated in the coil inserting jig 7, a pawl (not shown) grasps the intermediate portion 1a' (FIG. 1) of the electric wire 1, and the spool 3 and the coil push rods 5 rise to the predetermined positions, with the result that the coil inserting jig 7 is indexed in the direction of an arrow C in FIG. 3. At this time, the intermediate portion 1a' of the electric wire 1 grasped by the pawl moves to the winding position 1a'' and the spool 3 descends as far as the winding position, and thus, formation of the coil for the next pole is effected. When the intermediate portion 1a' of the electric wire 1 grasped by the pawl has been raised to the position 1a'', the coils accommodated in the coil inserting jig 7 tend to be floated, but the stop 11 prevents the coils from being floated. Meanwhile, the coils 6, which tend to be floated from the coil inserting jig 7 by spring back, are also prevented from being raised by the stop 11. Upon completion of formation of the coil 6 for one pole, the spool 3 and the coil push rods 5 descend in the direction of an arrow D, and at this time, the forward end 5a of the coil push rod 5 comes into contact with the stop 11 to move the rocking plate 12 downwardly, whereby not only the coil 6, which is above the stop 11 is depressed to below the stop 11, but also any coil located under the stop 11 is depressed under pressure. Subsequently as the coil push rods 5 rise, the rocking plate 12 is restored to the horizontal position by the balance weight 17, and the stop 11 blocks the coils tending to rise. It is to be noted that the support plate 13 prevents the rocking plate 12 and the stop 11 from being rotated upwardly beyond the horizontal position.

As is clear from the foregoing description, according to the arrangement of the present invention, the undesirable rising or floating of the coils accommodated on the coil inserting jig is prevented by the employment of the rockable stop, while coils above the stop can be pushed onto the lower part of the jig by the rocking function of said stop.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as being included therein.

What is claimed is:

1. A coil winding apparatus comprising:
   a coil winding spool on which coils are to be wound;
   a flyer member for winding electric wire around said coil winding spool to form the coils;
   a coil inserting jig which is positioned adjacent said spool member for receiving thereon coils formed on said spool member and rotatably supported for rotation with respect to said coil winding spool for having portions moved past said winding spool for receiving respective coils on the different portions of said winding spool;
   coil depressing means movable past said winding spool toward said coil inserting jig for moving coils off said winding spool onto said coil receiving jig; and
   a stop disposed beside said coil inserting jig and being reciprocally pivotable around an axis perpendicular to the direction of movement of said coil depressing means only between a position in which it extends directly toward said coil inserting jig and a position in which it is pivoted away from said coil depressing means to leave space between said stop and said coil inserting jig for passage of a coil onto said coil inserting jig, whereby coils already accomodated on said coil inserting jig are prevented from moving past said stop toward said winding spool.

2. A coil winding apparatus as claimed in claim 1 in which said stop comprises a stop member, a rocking plate pivotally mounted around said axis and on the free end of which said stop member is mounted, and a plate member extending into the path of pivotal movement of said stop member for blocking movement of said stop member past said position in which it extends directly toward said coil inserting jig.

3. A coil winding apparatus as claimed in claim 2 in which said coil inserting jig is positioned vertically and said axis is horizontal, and said rocking plate has a counterweight on the end thereof remote from said stop member normally biasing said stop member against said plate.

* * * * *